US005791903A

United States Patent [19]

Feuer et al.

[11] Patent Number: 5,791,903
[45] Date of Patent: *Aug. 11, 1998

[54] FLIGHT SIMULATOR WITH FULL ROLL ROTATION CAPABILITY

[75] Inventors: Eduard Feuer, Glendale; Ronald L. Brown, Phelan, both of Calif.; Banyat Somwong, Songkhla, Thailand

[73] Assignee: Fir Ride & Show Engineering, Inc., San Dimas, Calif.

[*] Notice: The term of this patent shall not extend beyond the expiration date of Pat. No. 5,453,011.

[21] Appl. No.: 840,426

[22] Filed: Apr. 29, 1997

Related U.S. Application Data

[63] Continuation of Ser. No. 340,287, Nov. 16, 1994, abandoned, which is a continuation-in-part of Ser. No. 75,695, Jun. 10, 1993, Pat. No. 5,453,011.

[51] Int. Cl.$^6$ .................................................. G09B 9/21
[52] U.S. Cl. ........................... 434/38; 434/55; 434/30; 472/59; 472/60; 472/130
[58] Field of Search ......................... 434/29, 30, 38, 434/44, 43, 55, 58; 472/130, 135, 59, 60

[56] References Cited

U.S. PATENT DOCUMENTS

| | | | |
|---|---|---|---|
| 2,485,266 | 10/1949 | Edinburg | 434/55 X |
| 3,281,962 | 11/1966 | Pancoe | 434/58 |
| 3,496,650 | 2/1970 | Kimball et al. | 434/55 |
| 3,584,429 | 6/1971 | Sidney | 434/55 |
| 4,019,261 | 4/1977 | Pancoe | 434/58 |
| 4,751,662 | 6/1988 | Crosbie | 434/55 X |
| 5,388,991 | 2/1995 | Morris | 434/43 X |
| 5,453,011 | 9/1995 | Feuer et al. | 434/55 X |

Primary Examiner—Jeffrey A. Smith
Attorney, Agent, or Firm—Christie, Parker & Hale, LLP

[57] ABSTRACT

A flight simulator for amusement rides simulating aircraft or space flight with visual presentations and motion having an operator station attached to a structural support frame through an articulating member providing unlimited angular rotation about a roll axis and limited angular rotation about a pitch axis. An electrical coupling concentric with a drive axle is rotatable through at least 360° about the roll axis.

3 Claims, 7 Drawing Sheets

FIG. 4

| RING # | FUNCTION |
|---|---|
| 27 | H ⎫ |
| 29 | N ⎬ 120VAC, 60HZ |
| 28 | G ⎭ |
| 26 | +V$_1$ — SWITCHES |
| 25 | RETURN, DOOR SWITCHES |
| 24 | " , GUN TRIGGER |
| 23 | " , GUN SELECT |
| 22 | " , RADAR |
| 21 | +V$_2$ — POTENTIOMETERS |
| 20 | RETURN, ROLL |
| 19 | " , PITCH |
| 18 | " , THROTTLE |
| 17 | COM$_2$ — POTENTIOMETERS |
| 16 | AUDIO, CHANNEL 1 (LEFT) |
| 15 | AUDIO, " 2 (RIGHT) |
| 14 | RETURN, AUDIO |
| 13 | GROUND — PROJ |
| 12 | R ⎫ |
| 11 | B ⎬ LEFT PROJ |
| 10 | G ⎪ |
| 9 | H — SYNC ⎭ |
| 8 | R ⎫ |
| 7 | B ⎬ CENTER PROJ |
| 6 | G ⎪ |
| 5 | H — SYNC ⎭ |
| 4 | R ⎫ |
| 3 | B ⎬ RIGHT PROJ |
| 2 | G ⎪ |
| 1 | H — SYNC ⎭ |

— 72

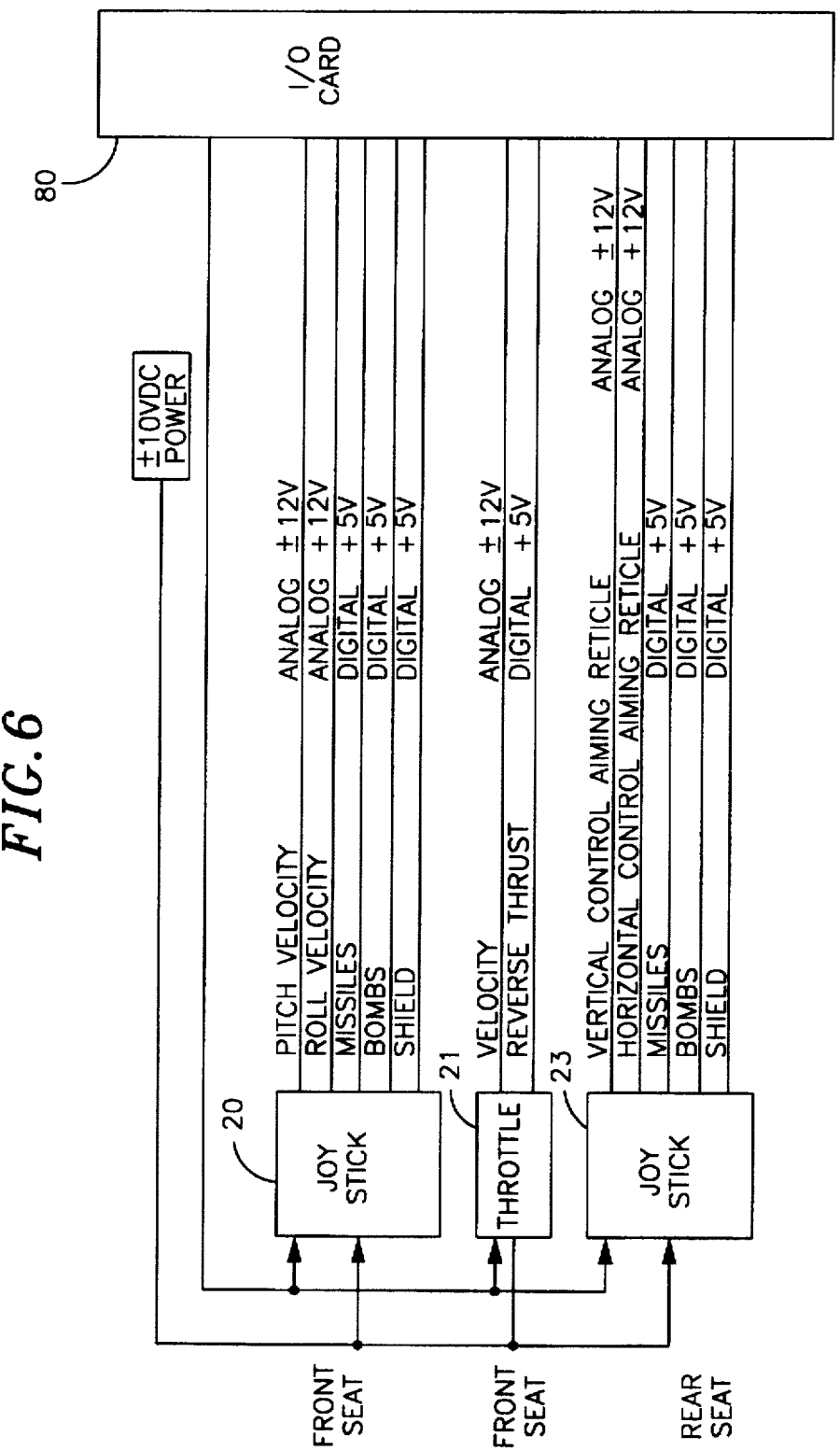

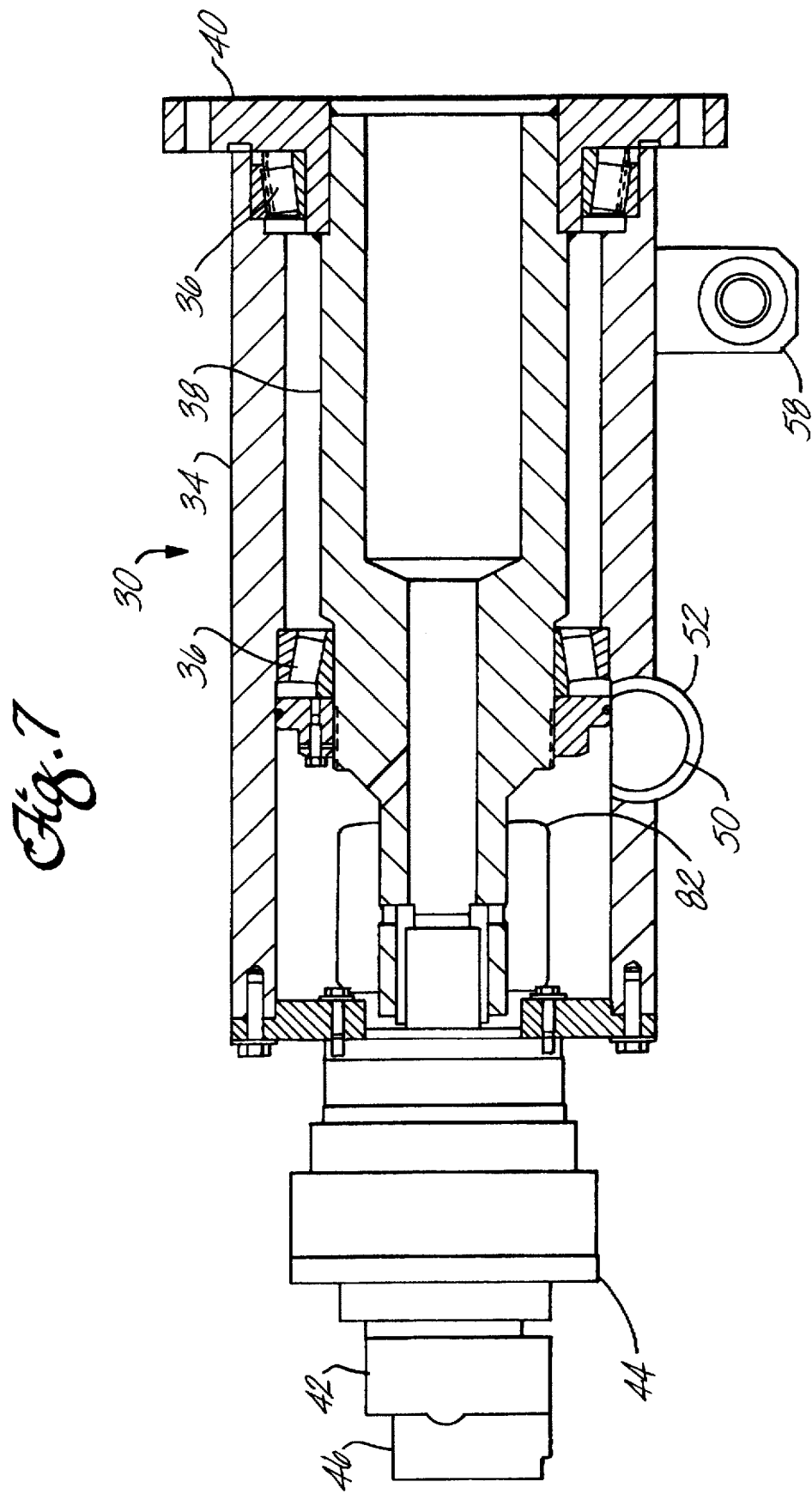

FLIGHT SIMULATOR WITH FULL ROLL ROTATION CAPABILITY

RELATED APPLICATIONS

The present application is a continuation of application Ser. No. 08/340,287, filed Nov. 16, 1994, which is now abandoned a continuation in part of U.S. patent application Ser. No. 08/075,695 (U.S. Pat. No. 5,453,011) filed on Jun. 10, 1993 entitled Flight Simulator having common inventors with the present application. The disclosure of the parent application is incorporated fully herein by reference.

BACKGROUND OF THE INVENTION

1. Field of the Invention

The present invention relates generally to the field of amusement rides which simulate aircraft or space flight with visual presentations and motion. In particular the flight simulator provides for independent control of rotation about a pitch axis and roll axis including the capability for complete inversion of an occupant station simulating a cockpit.

2. Prior Art

Motion simulators for training and amusement are well known in the art. Aircraft simulators for use by the military and airlines incorporate highly sophisticated hydraulic drive systems often offering up to six axes of motion for relatively short dimensional excursions. Amusement rides offering motion simulation for automobiles, space flight, aircraft and other fantasy travel have typically employed technology very similar to the high fidelity training simulators while somewhat reducing complexity and cost. A typical system employs a platform having an occupant station which incorporates a means for visual simulation through motion picture or computer-generated scenery imaging. The occupant platform is mounted on or suspended from multiple hydraulic actuators which impart motion to the platform. The number and mounting location of the actuators is determined in engineering tradeoffs for size of the actuators and the equations of motion to be used for the simulation. Three actuator systems and six actuator systems are common with mounting in a triangular pattern on the motion platform.

The cost and complexity of such hydraulic systems can be excessive for many applications, particularly in the amusement field where a reduction in fidelity is allowable, however full range of motion is still desired. In addition, hydraulically operated systems such as those described cannot provide a complete inversion of the occupant station. Inversion of the occupant station may in certain cases reduce the fidelity of the motion simulation, however, particularly in the field of amusement rides a greater range of motion to provide excitement for a ride, even though strict equations of motion for a spacecraft or aircraft being simulated are not followed, may be preferable.

In addition to the hydraulic complexity required by the majority of flight simulators, roll rotation through 360° is not possible due to the constraints imposed by electronic signaling requirements for controls, displays, safety equipment and other features of the simulator.

SUMMARY OF THE INVENTION

The flight simulator of the present invention incorporates an operator station having seating and operating controls for an occupant. A visual simulation system incorporating approximately 120° forward field of view is provided employing color projection from three projectors using reflected beams to semi-spherical screens on the cabin face separated by simulated window frames. A reflected beam system allows a compressed arrangement of the projectors relative to the screen reducing the necessary size for the operator station.

The operator station is attached to a structural support through a rotating axle assembly providing unlimited angular rotation about a first axis, preferably the simulated roll axis of the operator station. The axle assembly is mounted through a transverse bearing pin which provides limited angular rotation about a second axis, preferably the pitch axis for the operator station. An axle running through the rotating axle assembly, with tapered roller bearings supporting the axle within a case or hub of the axle assembly, is attached to the operator station through a rigid flange. A motor and gear reduction system provides rotation of the axle within the case for rotational about the first axis. A linear actuator attached to a lever arm depending from the case bottom provides leverage for pivotal rotation of the axle about the second axis.

The motor and linear actuator are controlled through digitally controlled hydraulic valves driven by a two axis motion controller. Inputs from the controls in the operator station are provided to a control computer which provides commands to the two axis motion controller for creating motion in the linear actuator and rotating axle derived from control equations responsive to the motion of the operator controls. A rotating electrical coupling concentric with the axle allows arrangement of the control computer system on board the operator station, with the coupling conducting motion control signals to the two axis motion controller, or mounting of the motion control computer off board on the support structure for direct connection to the motion controller with signals from the operator control on board the operator station provided through the rotating coupling.

BRIEF DESCRIPTION OF THE DRAWINGS

Details of the present invention will be more clearly understood with reference to the following drawings:

FIG. 4 is a schematic of the control signals provided through the rotating coupling for the embodiment of FIG. 3.

FIG. 6 is a schematic of the control signals for the embodiment of FIG. 5.

FIG. 7 is a detail sectional side elevation view of the rotating axle assembly.

DETAILED DESCRIPTION OF THE INVENTION

Figure 1:
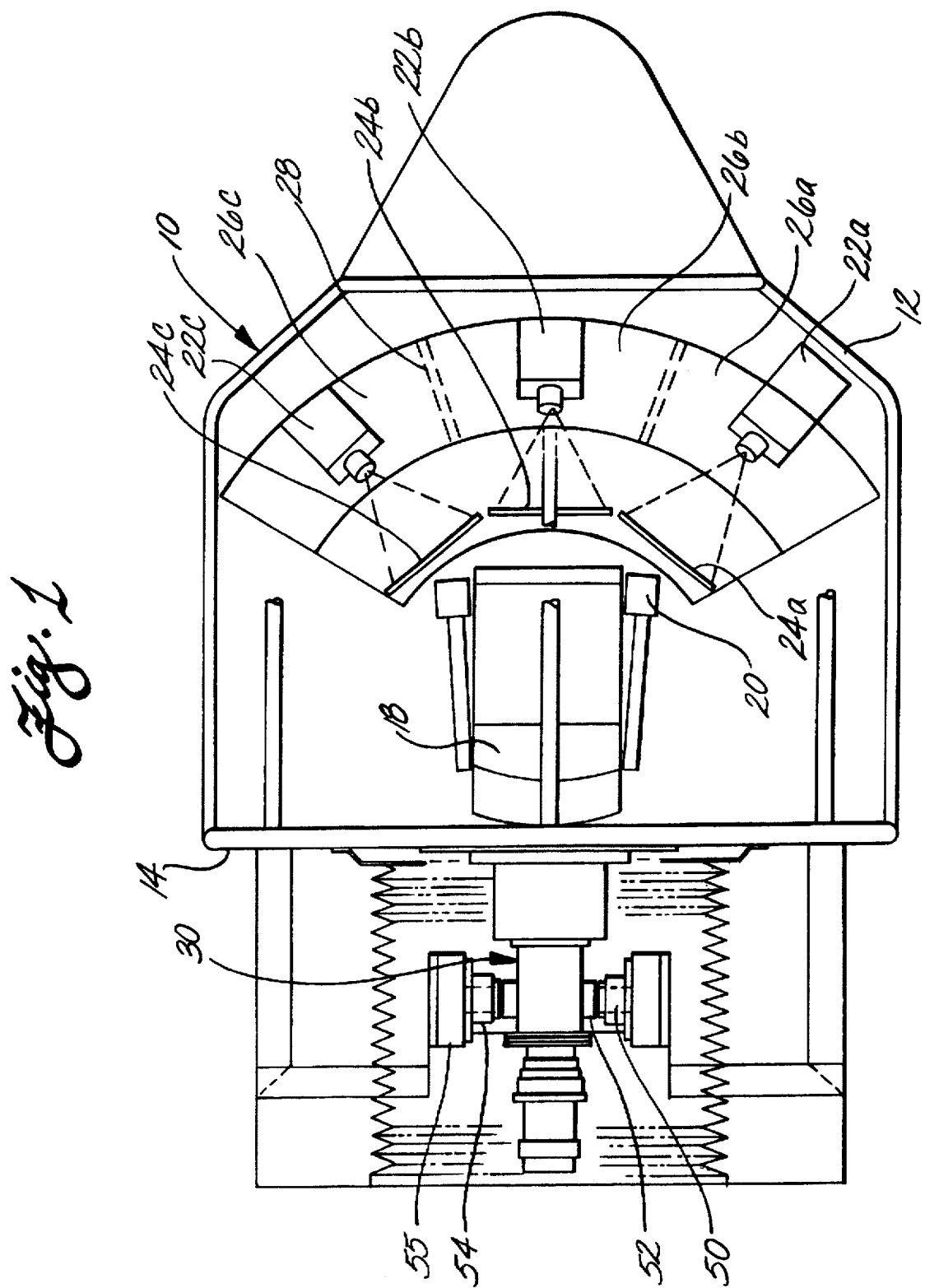
FIG. 1 is a top view of a first embodiment of the invention employing a single seat operator station.
Figure 2:
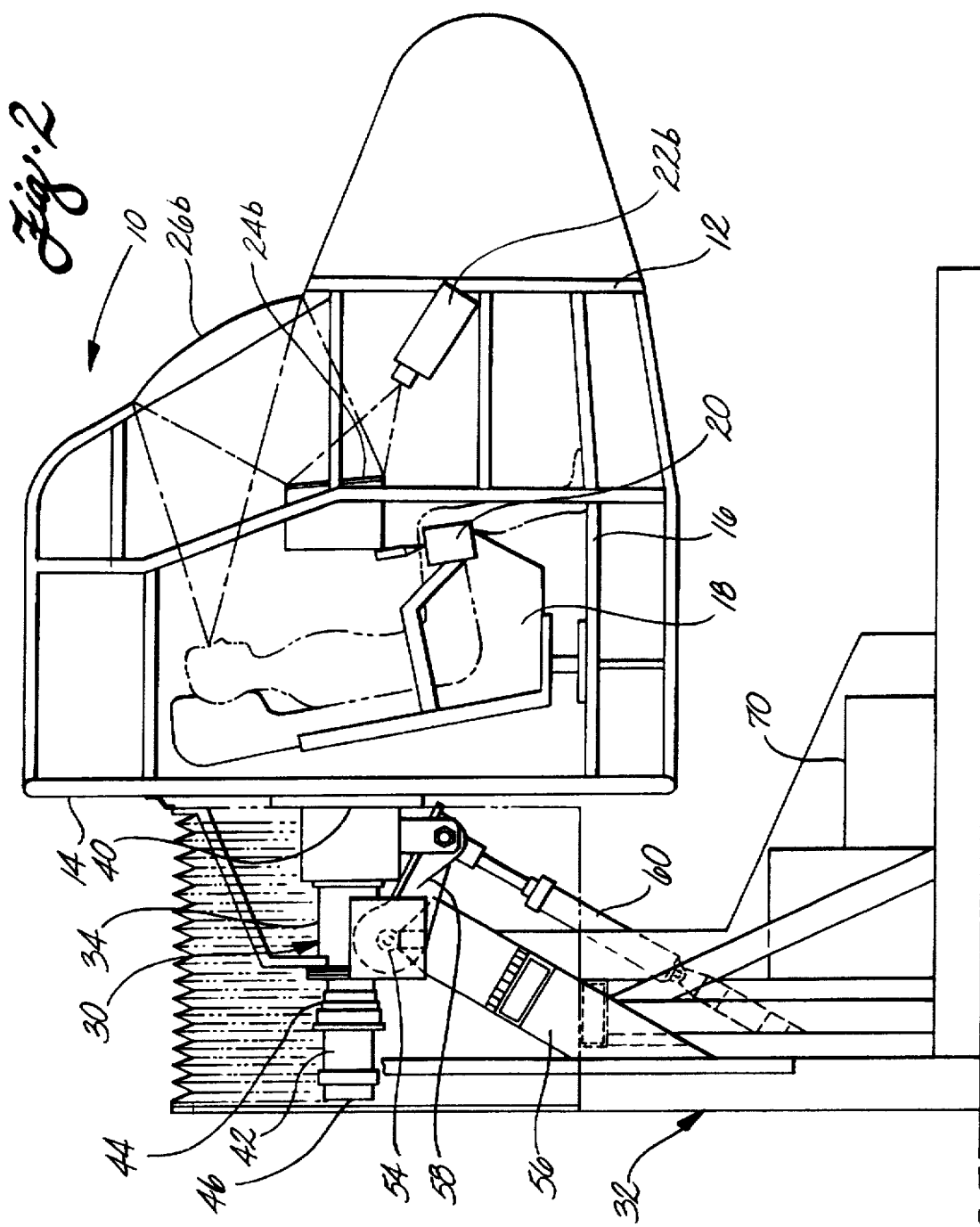
FIG. 2 is a side elevational view of the first embodiment of FIG. 1.
Figure 3:
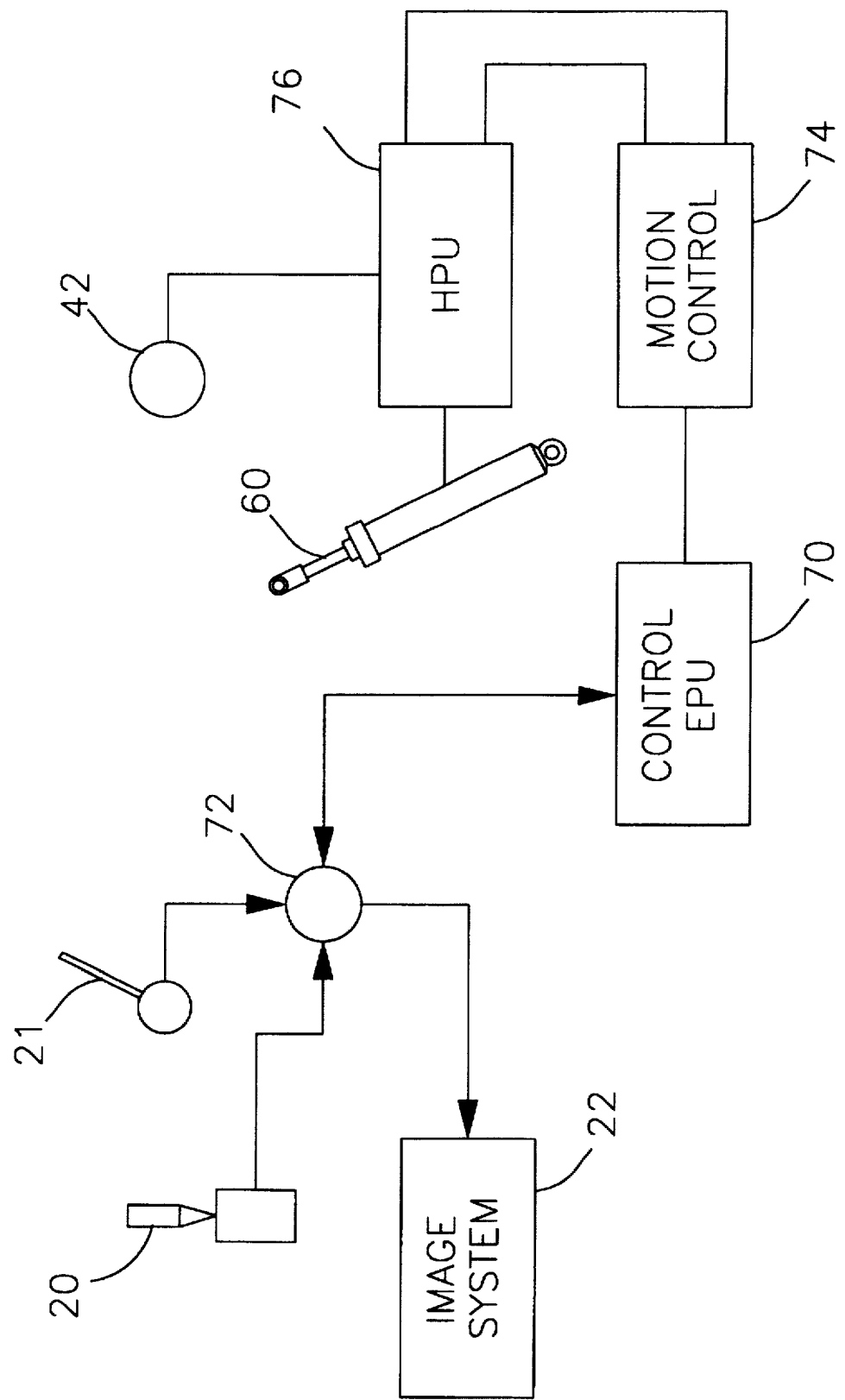
FIG. 3 is a block diagram schematic of the control system for the first embodiment with off board mounting of the control computer.

Referring to the drawings, FIG. 1 discloses a first embodiment of the invention for a single seat motion simulator. The operator station or seat capsule 10 incorporates a structural cage 12 mounted to a back plane 14. As best seen in FIG. 2, a floor 16 mounted within the cage supports a seat 18 for the occupant or patron. Operator controls in the form of an aircraft type stick 20 and throttle 21 (FIG. 3) are mounted proximate the seat for operation by the occupant.

A visual display for the occupant is provided by a projector system which incorporates three projectors 22a, 22b and 22c. Each projector provides three color imagery in a folded reflection arrangement by directing the projection substantially rearward to a first surface mirror 24a, 24b and 24c, respectively, which reflects the imagery to a semi-spherical screen. As shown in FIG. 1, three projectors provide three reflected images of approximately 40° each to three separate spherical screen segments 26a, 26b and 26c. The three screens are separated by simulated window frame posts 28 in the embodiment shown. Those skilled in the art will recognize that projection arrangements for seamless imagery projection by the three projectors may be employed.

The operator station is supported from the back plane by the axle assembly 30 which is attached to the structural support frame 32. The axle assembly incorporates a case 34 with bearings 36 supporting an axle 38 as best seen in detail in FIG. 7. The axle is rigidly attached to the occupant station back plane through a flange 40. A hydraulic motor 42 rotationally drives the axle through a planetary gear box 44 employed to obtain proper rotational speeds and mechanical advantage. A hydraulic brake assembly 46 is employed for positive positioning control. In a preferred embodiment the hydraulic motor comprises a Von Ruden model RSB04S while the planetary gear box comprises a Von Ruden series 300 providing a 10/1 gear reduction and the hydraulic brake comprises a Von Ruden B045228. Mounting of the rotating axle assembly to the support structure is accomplished through a transverse mounting pin 50 supported in a sleeve 52 welded to the case transverse to the rotational axis of the axle. The pin is supported in bearings 54 which are mounted in trunnions 55 on support arms 56 which are in turn attached to the remainder of the structural support and appropriately braced.

A lever arm 58 as best seen in FIGS. 2 and 7 is connected to the case and provides attachment for a linear actuator such as hydraulic cylinder 60 which is in turn pivotally mounted to the support frame.

Rotation about the first axis by driving of the axle with the hydraulic motor is unlimited due to the novel structural arrangement of the present invention. In the embodiment shown in the drawings where the first axis comprises a roll axis for the occupant station, simulation of complete 360° and greater rolls are possible. Rotation about the second axis transverse to the first axis is accomplished by actuation of the hydraulic cylinder. In the embodiment shown in the drawing, pitch rotation of approximately ±60° is possible for total excursion of the operator station of approximately 120° in the pitch plane.

The simple mechanical structure of the present invention allows dramatic simulation of two axes of motion using only two motion sources, the hydraulic motor driving the axle for roll motion and the hydraulic cylinder providing the linear actuator for pitch motion. Dramatic simulations are possible simulating extended zero or negative G motion not possible in conventional simulators. While fidelity of the equations of motion for simulation of an actual aircraft may be slightly compromised based on the unlimited roll capability. Use of the simulator as an amusement attraction is significantly enhanced by this feature.

Control of the simulator is accomplished through a computer simulation system which employs inputs from the operator control stick and throttle as representing the desired motion. A first embodiment of the control system is shown in FIG. 4 wherein a control computer 70 is mounted off board from the operator station. Communications with the control CPU by the imaging system 22 comprising the three projectors 22a, 22b, and 22c the control stick 20 and a throttle 21 is accomplished through a rotatable coupling comprising a slip ring assembly 72. In the embodiment shown, the slip ring assembly comprises a 29 circuit slip ring carrying the signals disclosed in FIG. 4. 120v power for the projectors is provided through three connections on the slip ring. A switch reference voltage, a potentiometer reference voltage and a potentiometer common employ three rings while switch return circuits for door position switch, gun trigger, gun select and radar on/off comprise four rings. Pitch and roll potentiometer return signals from the control stick comprise two rings while the potentiometer return from the throttle comprises one ring. Audio communications are provided on two channels with an audio return on a third ring. A projector ground is provided and red, blue and green projection signals with horizontal sync are provided for each projector. In this embodiment, the preferred slip ring is a Fabricast model 2462-3.627-29-36U.

In the embodiment shown in the drawings, motion of the seat capsule simulates the flight of an aircraft. Inputs from the control stick 20 in the occupant station are provided to the control computer which calculates position and motion equations in time sequence based on the control inputs. The throttle provides a positive or negative velocity component for the control equations. The equations of motion derived by the computer are provided to the two axis motion control system 74, which provides servo control for digitally controlled valves in the hydraulic power unit 76 to drive the motor 42 and hydraulic cylinder 60 for roll and pitch motion respectively. The two channels of the motion controller compare position information commanded by the computer with current encoded position and provide velocity commands to the hydraulics for motion control.

In the present embodiment an XTAR flight dynamics computer system is employed to simulate aircraft flight. The XTAR flight dynamic system incorporates equations of motion to create occupant station position and motion to simulate aircraft flight. The visual display in the operator station is also controlled by the equations of motion provided by the XTAR flight dynamics computer. Digital imagery is generated in the control computer and provided to the projectors for display on the screens in the occupant station.

Figure 5:
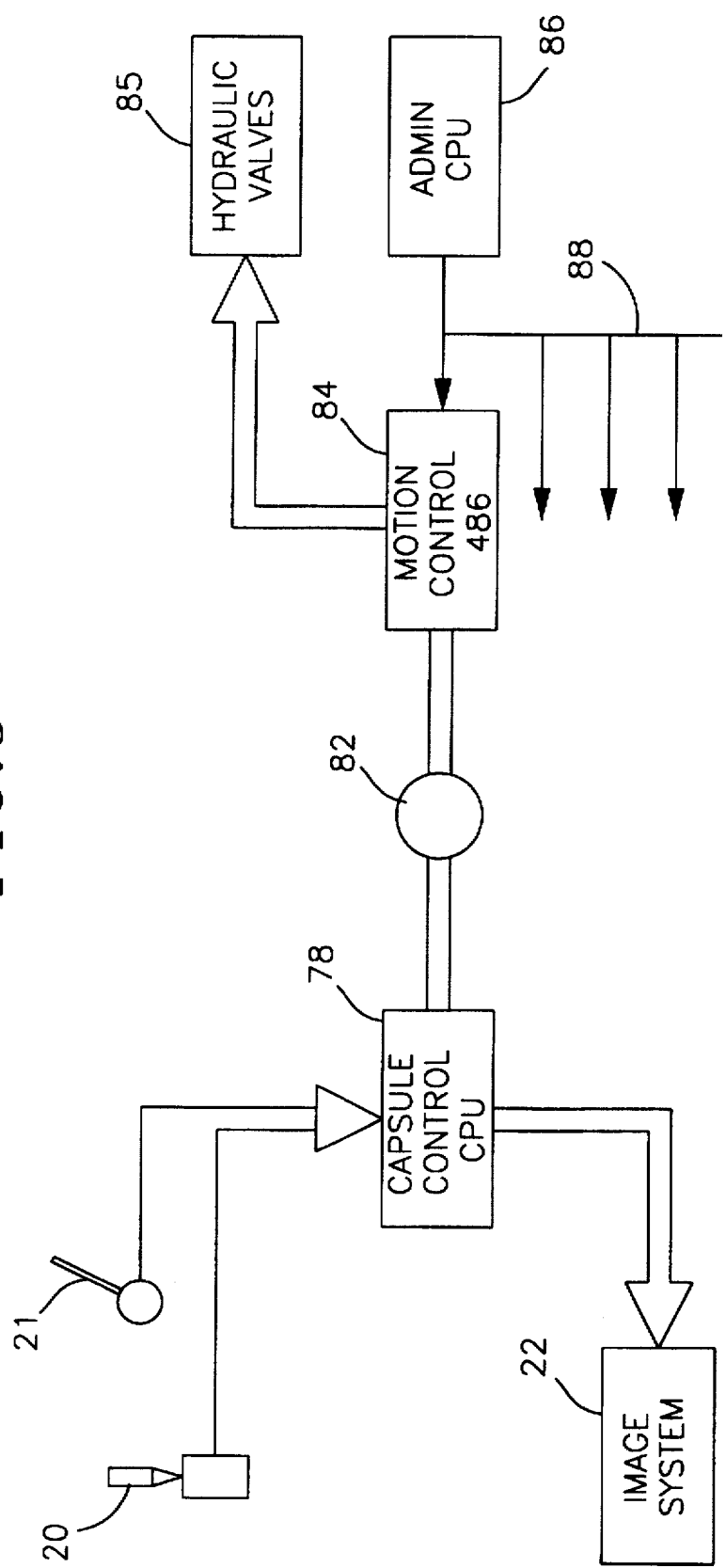
FIG. 5 is a schematic block diagram of the control system arrangement for a second embodiment employing on board mounting of the control computer.

A second embodiment of the control system employing on board mounting of the control computer is shown in FIG. 5. The occupant station or capsule control computer 78 is mounted on board the occupant station. Control inputs provided by the operator control stick and throttle as previously described are available directly to an I/O card in the capsule control computer. Similarly, the capsule control computer provides image data for the projectors to be displayed on the screens in the occupant station. Placement of the control computer on board using a Pentium® based processor allows substantially unlimited expansion of the control input capability for the system. As shown in FIG. 6, a plurality of controls can now be available including pitch velocity and roll velocity from the control stick, missiles, bombs, shield, etc. from switch controls, and velocity and reverse thrust from the throttle. Expansion of the occupant station to a two seat configuration is easily accomplished allowing additional inputs from a second joy stick 23 in the system providing signals such a vertical control aiming reticle and horizontal control aiming reticle and additional bombs and shield controls. A standard I/O card 80 interfaces the capsule control computer to the various control signals.

Returning to FIG. 5, placing of the control computer on board allows simplification of the rotating electrical coupling system to a slip ring 82 with a reduced number of circuits. Communication from the capsule control computer employs standard four wire ETHERNET® communication for all control functions. This allows the use of an eleven circuit slip ring which employs three circuits for 120v AC power, four circuits for the Ethernet®, two individual circuits for safety interlocks such as a door switch, and two capsule to control console audio communication lines. A preferred slip ring for use in the second embodiment is a Maurey Instruments model SR 2775-6-11-3.627 slip ring connector system.

The Ethernet® communication from the capsule control computer is provided to the motion controller 84 which in the second embodiment comprises a 486 processor. The motion control system interfaces with the digitally controlled hydraulic valves 85 for control of the motor and linear actuator as previously described.

For use of the second embodiment in an amusement arcade, an administrative computer 86 is employed for communication with the motion controller on a bus 88 having the capacity to communicate with a plurality of motion control computers. The administrative CPU may provide system interlocks to activate the motion controllers for each of a plurality of motion simulators.

Having now described the invention in detail as required by the patent statutes, those skilled in the art will recognize modifications and substitutions to the elements of the embodiments shown. Such modifications and substitutions are within the scope and intent of the invention as defined in the following claims.

What is claimed is:

1. A motion simulator comprising:

an occupant station incorporating seating for at least one occupant and first and second input controls operable by the occupant;

a support frame;

a rotatable axle assembly interconnecting the support frame and the occupant station, the rotatable axle assembly providing rotation of the occupant station through at least 360° about a roll axis, said rotatable axle further interconnected to said support frame through a pivot and additionally providing rotation of the occupant station about a pitch axis, the rotatable axle assembly including a drive axle rotatable about the roll axis and rigidly connected to the occupant station, a motor driving the axle for rotational motion, and a rotatable electrical coupling concentric with the axle and rotatable through at least 360° about the roll axis;

an actuator for rotating said axle assembly about said pitch axis; and a control computer receiving a first electrical signal from the first input control and a second electrical signal from the second input control through the rotatable coupling, applying defined rules of motion based on instantaneous roll and pitch position of the occupant station and the first and second electrical signals, and providing a first output for control of the motor proportional to the roll position and first electrical signal and an a second output for control of the actuator proportional to the pitch position and second electrical signal.

2. A simulator as defined in claim 1 further comprising visual simulation means mounted in the occupant station and providing a display corresponding to outputs of the control computer with image data provided by said control computer to the visual simulation means through said rotatable electrical coupling.

3. A motion simulator comprising:

an occupant station incorporating seating for at least one occupant and first and second input controls operable by the occupant;

a support frame;

a rotatable axle assembly interconnecting the support frame and the occupant station, the rotatable axle assembly providing rotation of the occupant station through at least 360° about a roll axis, said rotatable axle further interconnected to said support frame through a pivot and additionally providing rotation of the occupant station about a pitch axis, the rotatable axle assembly including a drive axle rotatable about the roll axis and rigidly connected to the occupant station, a motor driving the axle for rotational motion, and a rotatable electrical coupling concentric with the axle and rotatable through at least 360° about the roll axis;

an actuator for rotating said axle assembly about said pitch axis; and a control computer on board the occupant station receiving a first electrical signal from the first input control, and a second electrical signal from the second input control, applying defined rules of motion based on instantaneous roll and pitch position of the occupant station and the first and second electrical signals, and providing a first output through the rotatable coupling for control of the motor proportional to the roll position and first electrical signal and an a second output through the rotatable coupling for control of the actuator proportional to the pitch position and second electrical signal.

* * * * *